United States Patent
Mosquera et al.

(10) Patent No.: US 6,663,175 B2
(45) Date of Patent: *Dec. 16, 2003

(54) VEHICLE SEAT COVER, AND A VEHICLE SEAT INCLUDING SUCH A COVER

(75) Inventors: Pablo Mosquera, Echarcon (FR); Roger Racenet, Mereville (FR)

(73) Assignee: Faurecia Sieges d'automobile S.A., Boulogne (FR)

( * ) Notice: Subject to any disclaimer, the term of this patent is extended or adjusted under 35 U.S.C. 154(b) by 55 days.

This patent is subject to a terminal disclaimer.

(21) Appl. No.: 10/046,857

(22) Filed: Jan. 15, 2002

(65) Prior Publication Data

US 2002/0101101 A1 Aug. 1, 2002

(30) Foreign Application Priority Data

Jan. 31, 2001 (FR) .............................. 01 01307

(51) Int. Cl.[7] ................................................ A47C 7/74
(52) U.S. Cl. .............................. 297/180.12; 297/180.1; 297/217.3; 5/421; 219/217
(58) Field of Search ........................ 297/217.3, 180.11, 297/180.12, 180.1; 5/421; 219/605, 636, 212, 217

(56) References Cited

U.S. PATENT DOCUMENTS

| | | | |
|---|---|---|---|
| 2,154,184 A | | 4/1939 | Roberts ...................... 219/528 |
| 2,712,592 A | * | 7/1955 | Goldstein et al. ........... 219/217 |
| 2,782,289 A | * | 2/1957 | Nathanson ................... 219/217 |
| 3,017,493 A | * | 1/1962 | Cooke ......................... 219/217 |
| 3,033,970 A | | 5/1962 | Eisler .......................... 112/255 |
| 3,472,289 A | | 10/1969 | Webber et al. .......... 139/425 R |
| 4,590,359 A | | 5/1986 | Mobius ....................... 219/217 |
| 4,869,550 A | * | 9/1989 | Lorenzen et al. ....... 219/180.12 |
| 4,964,674 A | * | 10/1990 | Altmann et al. ........ 297/180.12 |
| 5,002,335 A | | 3/1991 | Bengtsson ............. 297/180.12 |
| 5,928,548 A | | 7/1999 | Johansson ................... 219/528 |
| 6,073,998 A | * | 6/2000 | Siarkowski et al. 297/180.11 X |
| 6,127,655 A | * | 10/2000 | Humes et al. ...... 297/180.12 X |
| 6,531,687 B2 | * | 3/2003 | Michelmann ...... 297/180.12 X |
| 6,540,303 B2 | * | 4/2003 | Mosquera .......... 297/180.12 X |

FOREIGN PATENT DOCUMENTS

| | | | | |
|---|---|---|---|---|
| DE | 3513909 A1 | * | 10/1986 | ............. 297/180.12 |
| EP | 0 347 969 | | 12/1989 | |
| EP | 0 463 516 | | 1/1992 | |
| WO | WO 94/09684 | * | 5/1994 | ............. 297/180.12 |

* cited by examiner

*Primary Examiner*—Rodney B. White
(74) *Attorney, Agent, or Firm*—McCracken & Frank

(57) ABSTRACT

A flexible cover for a vehicle seat has an inside face with a conductive thread fixed thereagainst to form a seam in chain stitch that does not pass through the cover and that is not visible on the outside face of the cover.

3 Claims, 2 Drawing Sheets

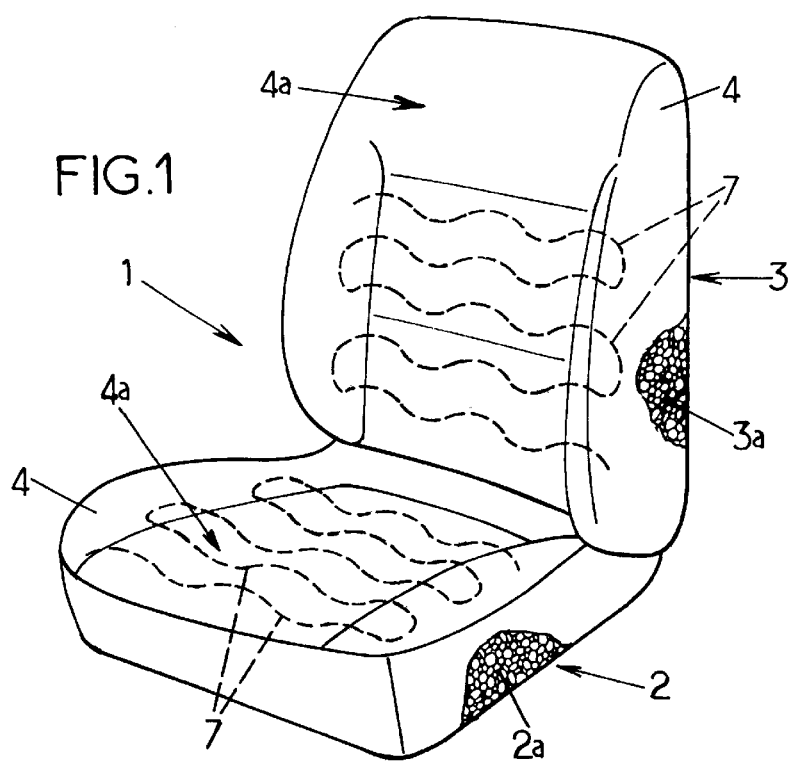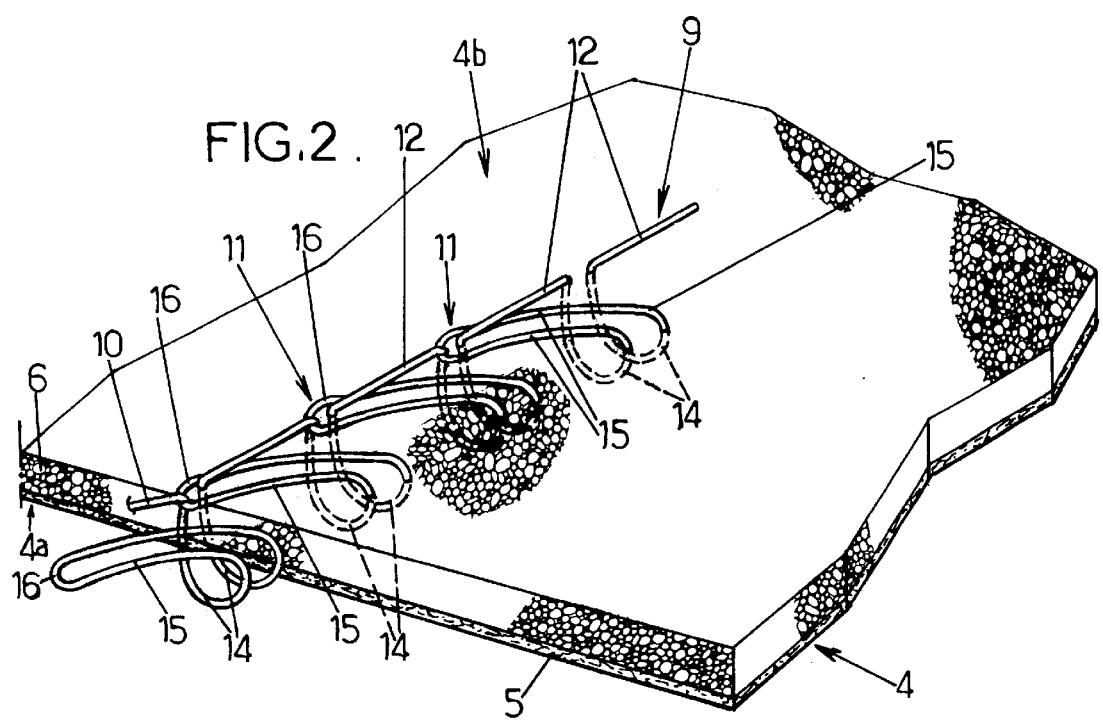

VEHICLE SEAT COVER, AND A VEHICLE SEAT INCLUDING SUCH A COVER

The present invention relates to vehicle seat covers, and to vehicle seats including such covers.

More particularly, the invention relates to a flexible cover for covering flexible padding belonging to a vehicle seat, the cover having an inside face for facing the padding and an outside face designed to be visible to a user of the seat, said cover presenting a certain thickness between its inside and outside faces, and having at least one electrically conductive thread fixed to its inside face.

BACKGROUND OF THE INVENTION

Document EP-A-0 347 969 describes an example of such a seat cover in which the conductive thread is an electric heater wire which is heat-sealed under the cover. That type of conductive thread fixing presents the advantage of being invisible from outside the seat. However the process whereby the conductive thread is assembled under the cover is complex and requires tooling that is expensive.

OBJECTS AND SUMMARY OF THE INVENTION

A particular object of the present invention is to mitigate that drawback without losing the advantage of the invisible character of the way in which the conductive thread is fixed under the cover.

To this end, according to the invention, in a cover of the kind in question, the conductive thread is sewn to the inside face of the cover and forms a non-through seam that is not visible from the outside face of the cover, the conductive thread including portions which penetrate into the thickness of the cover and portions which are placed against the inside face of said cover.

By means of these dispositions, assembly of the conductive thread against the inside face of the cover requires no tooling other than conventional sewing tooling which is easy to use and inexpensive.

Advantageously, the seam comprises a single conductive thread sewn using a chain stitch.

The invention also provides a vehicle seat comprising flexible padding covered by a cover as defined above, with the inside face of the cover being placed against the flexible padding.

BRIEF DESCRIPTION OF THE DRAWINGS

Other characteristics and advantages of the invention appear from the following description of an embodiment thereof, given by way of non-limiting example and with reference to the accompanying drawings.

In the drawings:

FIG. 1 is a diagrammatic perspective view of a vehicle seat fitted with a cover constituting an embodiment of the invention;

FIG. 2 is a cutaway view of the FIG. 1 seat cover, the cover being shown with its inside face looking upwards.

MORE DETAILED DESCRIPTION

Figure 3:
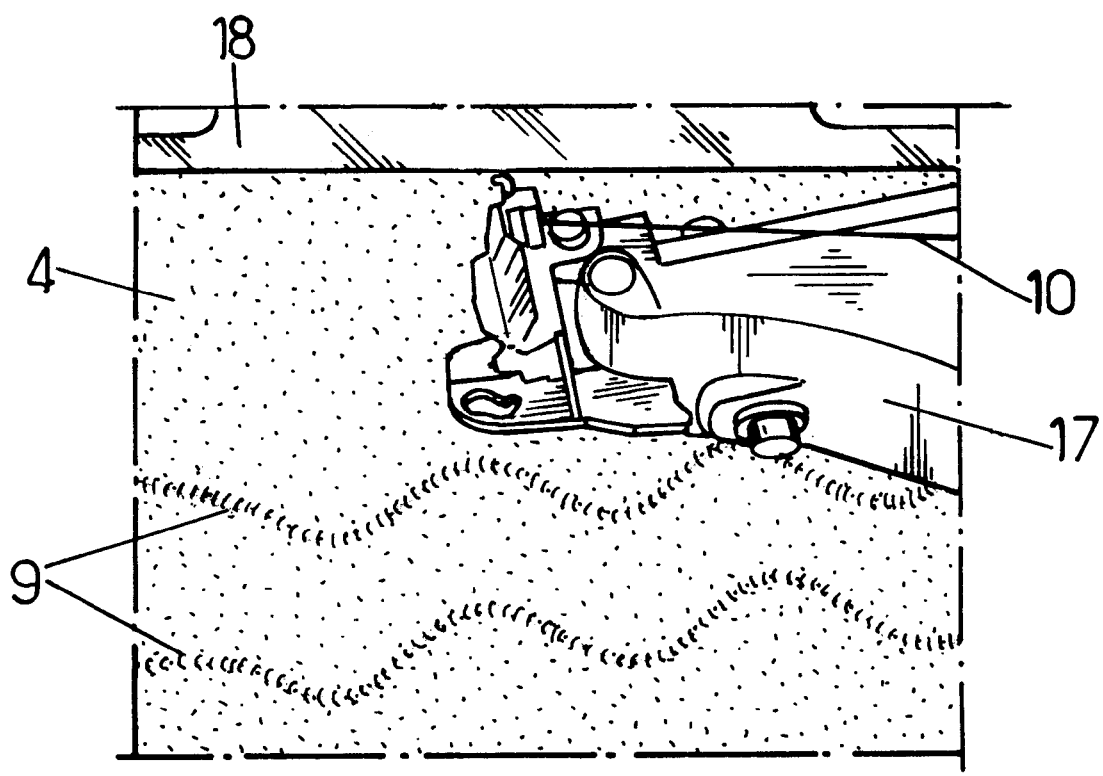
FIG. 3 shows the process whereby conductive threads are assembled under the FIG. 2 cover.

In the figures, the same references are used to designate elements that are identical or similar.

FIG. 1 shows a motor vehicle seat 1 having a seat proper 2 and a back 3. The seat proper 2 and the back 3 have flexible padding respectively referenced 2a and 3a, generally made of synthetic foam and supported by a rigid internal frame (not shown), and which is covered on the outside in a cover 4.

Beneath the cover 4 of the seat proper 2 and/or of the back 3 there are fixed one or more networks of electrically conductive threads each comprising at least one conductive thread 10.

As shown in FIG. 2, each conductive thread 10 is sewn against the inside face 4b of the cover by forming a non-through seam 9 that is not visible on the outside face 4a of the cover.

When the cover 4 has a textile layer 5 on its outside face 4 and a layer of foam 6 or other flexible material on its inside face 4b, the conductive thread 10 can penetrate merely into the foam layer 6, for example.

Preferably, and as shown in FIG. 2, each seam 9 comprises a single thread 10 sewn using a chain stitch, with this stitch having international code number 103 and/or 105 (ISO standard 4915).

In this chain stitch, the thread 10 forms successive loops 11 which penetrate into the foam 6 of the cover and whose ends 16 are adjacent to each other. The pitch of the chain stitch, i.e. the distance between two successive ends 16 can lie in the range 1 millimeter (mm) to 5 mm, for example.

These successive loops are connected to one another by rectilinear segments 12, each extending between the ends 16 of two adjacent loops 11.

Each of said loops 11 comprises:

two parallel curved segments 14 respectively extending the two rectilinear segments 12 which terminate at the end 16 of the preceding loop 11, these curved segments 14 penetrating into the foam 6 of the cover; and then two parallel segments 15 which extend the curved segments 14 respectively and which come back out of the foam 6 in the inside face 4b of the cover, these two segments 14 covering the face 4b of the cover and meeting to form the end 16 of the loop 11 in question.

As shown diagrammatically in FIG. 3, the seams 9 can be made, for example, by using tooling comprising:

a sewing machine 17 provided with a conventional curved needle head adapted to perform chain stitch, the head of this sewing machine being fed with conductive thread 10; and advantageously a horizontal moving flatbed 18 supporting the cover 4 beneath the head of the sewing machine 17, the flatbed 18 being movable horizontally in two perpendicular directions to make it easier for the seam 9 to follow complex paths, where so desired, e.g. wavy paths such as those shown in FIG. 3.

By way of non-limiting example, it is possible for the conductive thread 10 to be a metal wire such as that sold under the reference 275×2HQ by Sprintmetal (Usinor group, France), for example.

Each conductive thread 10 can be made up of the following, for example:

an electrical heater wire for making the seat more comfortable in winter;

an electrical wire for powering apparatus integrated in the seat 1; and a sensor, in particular for detecting the presence and/or the posture of a user sitting on the seat 1.

What is claimed is:

1. A vehicle seat comprising flexible padding covered by a flexible cover, the cover having an inside face facing the padding and an outside face which is visible to a user of the seat, said cover having a certain thickness between the inside and outside faces, and having at least one electrically conductive thread fixed to the inside face, wherein conductive thread is sewn to the inside face of the cover and forms a non-through seam that is not visible from the outside face of the cover, the conductive thread including portions which penetrate into the thickness of the cover and portions which are placed against the inside face of said cover.

2. A vehicle seat according to claim 1, in which the seam comprises a single conductive thread sewn using a chain stitch.

3. A vehicle seat according to claim 1, wherein the flexible cover includes an external layer and an internal layer of foam, the conductive thread being sewn solely to the internal layer of foam.

* * * * *